United States Patent [19]

Armstrong et al.

[11] Patent Number: 4,776,206

[45] Date of Patent: Oct. 11, 1988

[54] LEAK TESTING BY GAS FLOW SIGNATURE ANALYSIS

[75] Inventors: Randolph K. Armstrong, Cincinnati; Carol S. Wentzel, Green Township, Hamilton County; Carl G. Gatton, Hamilton, all of Ohio

[73] Assignee: Xetron Corporation, Cincinnati, Ohio

[21] Appl. No.: 84,264

[22] Filed: Aug. 11, 1987

[51] Int. Cl.⁴ .................................................. G01M 3/26
[52] U.S. Cl. .................................................... 73/40
[58] Field of Search ................................... 73/40, 49.2

[56] References Cited

U.S. PATENT DOCUMENTS

| | | | |
|---|---|---|---|
| 3,691,821 | 9/1972 | Davey | 73/49.2 |
| 3,872,712 | 3/1975 | Westervelt et al. | 73/40 |
| 3,918,291 | 11/1975 | Pauly et al. | 73/40 |
| 4,350,038 | 9/1982 | Soncrant | 73/49.2 |
| 4,523,452 | 6/1985 | Brayman | 73/40 |
| 4,532,795 | 8/1985 | Brayman et al. | 73/40 |
| 4,575,807 | 3/1986 | Dodge | 73/40 X |

Primary Examiner—Tom Noland
Assistant Examiner—Joseph W. Roskos
Attorney, Agent, or Firm—R. P. Lenart

[57] ABSTRACT

To leak test a cavity in a test item, a pressurizing gas, at a preselected pressure is applied to the test item and the flow rate of the pressurizing gas during pressurization is recorded. This recorded flow rate is compared with a threshold level based on gas flow signature data for a reference test item. If the recorded gas flow exceeds the threshold level, an excessive leak signal is produced. This leak testing method significantly reduces the time required to perform low flow rate leak detection in large volume test items.

14 Claims, 2 Drawing Sheets

LEAK TESTING BY GAS FLOW SIGNATURE ANALYSIS

BACKGROUND OF THE INVENTION

This invention relates to methods for leak testing cavities in test items and, more particularly, to such methods in which the leak testing is accomplished by monitoring the rate of flow of pressurizing gas into the cavity.

Production line leak testing of items such as refrigeration systems is being continually challenged to keep pace with contemporary manufacturing strategies and technologies. New requirements often include increased quality and safety considerations, low cost or improved performance parts with thinner sections that are more susceptible to leakage, and increased production rates requiring shorter test cycle times.

Most previous production line leak detection methods require pressurization of the test item with a gas or liquid. After a stabilization period, the leak is measured by detecting the presence of the leaking gas, sensing pressure decay, or measuring gas flow necessary to maintain the system pressure. Typical leak detection systems employ one of two fundamental measurement techniques: pressure decay detection or steady-state flow detection.

In pressure decay detection, a test item is pressurized by connecting it to a gas pressure source. When the test item has reached a predetermined pressure, the test item is isolated from the source. After this point, a leak in the test item will produce a drop or decay in the test item pressure. If the volume of the test item is known, the amount of decay in the pressure can be used to calculate the magnitude of the leak. Although this method has significant utility, it may include false pressure decays from adiabatic or thermal changes in the test item.

In the steady-state flow detection test method, the test item is also connected to a gas pressure source. In this method, however, the source pressure is not isolated from the test item at any time during the test sequence. When the test item has been pressurized to reach a steady-state condition with the source pressure, any subsequent gas flow into the test item will be due to a leak in the test item. This gas flow can be measured using a gas flow meter and is representative of the flow rate of the leak. Steady-state flow detection may require excessive time for the test item to reach the required steady-state condition.

Pressure decay detection and steady-state flow detection both require the pressurization and stabilization of the test item prior to monitoring for a leak. A test item must be at a stable preset pressure before pressure decay detection or steady-state flow detection can begin. After the test item pressure has stabilized, the flow or pressure can be sampled to detect if the test item has an excessive leak. The required pressurization and stabilization result in significantly long test sequences that can slow the production rate of the test items. An object of the present invention is a significant reduction in time required to perform leak testing of cavities in test items.

SUMMARY OF THE INVENTION

A method of leak testing a cavity in a test item performed in accordance with the present invention begins with the application of a pressurizing gas, at a preselected pressure to a cavity in the test item. The flow of pressurizing gas is recorded during pressurization of the cavity and the recorded flow is compared with predetermined gas flow signature data to determine if the recorded gas flow exceeds a preselected leak rate. An excessive leak indication is produced if the recorded gas flow rate exceeds the preselected leak rate.

With this method, a leak can be detected prior to pressure stabilization of the test item cavity.

BRIEF DESCRIPTION OF THE DRAWINGS

The invention will become more readily apparent from the following description of the preferred embodiment thereof shown, by way of example only, in the accompanying drawings wherein.

DESCRIPTION OF THE PREFERRED EMBODIMENT

In the preferred embodiment of the present invention, a cavity in a test item, such as a refrigeration system, is pressurized in a manner similar to that used in traditional dynamic flow leak testing. During pressurization, the gas flow rate is recorded. This flow rate is analyzed to determine if the leak rate of the test item exceeds a predetermined leak rate.

Figure 1:
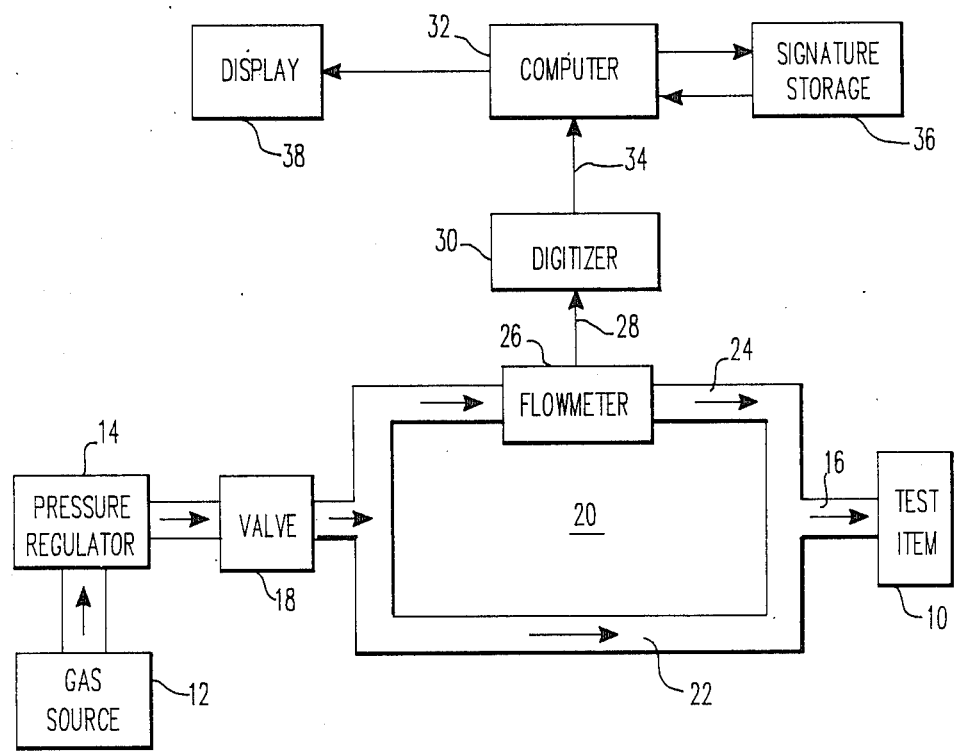
FIG. 1 is a block diagram of a leak detection system configured to perform the method of the present invention.

FIG. 1 is a block diagram of a leak testing system which performs the method of the present invention. Pressurization of a cavity in test item 10 is accomplished by applying a source of gas 12 at a predetermined pressure, set by pressure regulator 14, to the cavity through a gas flow conduit 16. When valve 18 is opened, gas flow to the test item is driven by the pressure differential between the regulated source gas pressure and the pressure in the test item cavity. As the test item cavity pressure rises exponentially toward the source pressure, the gas flow decreases exponentially. The measured gas flow will decrease and eventually equal the flow due to any leaks in the test item. This is the flow detected by traditional dynamic flow testing. Since the test item pressure and induced gas flow asymptotically approach their final values, waiting for flow stabilization can result in excessive test time. For example, measuring a 35 standard cubic centimeter per minute leak in a 2000 cubic centimeter refrigeration system using 125 pounds per square inch source pressure can take 2.5 minutes using conventional flow meter techniques. By using gas flow signature analysis in accordance with this invention, the gas flow rate for that system within the first 13 seconds of pressurization has been used to predict the actual leak rate, thereby reducing the time required for each test cycle.

In the system of FIG. 1, nitrogen has been used as the pressurizing gas, but other gases may also be used. The gas flow conduit includes a flow divider 20 having two parallel connected flow paths. A bypass, or fill flow path 22 is used to pass most of the pressurizing gas to the cavity in the test item and is continually open during the test sequence. A second fractional flow path 24 includes a flow meter 26 which produces a scaled flow rate or fractional flow rate signal in analog form on line 28.

This signal is converted to a digital signal by an analog-to-digital converter 30 and sent to a computer 32 by way of line 34. The computer records the digital signal as a signature for that particular test item. This recorded digital data signature is then compared with reference signature data stored in signature storage memory 36. If the recorded gas flow signature data for this test item exceeds a preselected threshold level established by the reference gas flow signature data, an excessive leak signal is produced by the computer 32 and indicated on display 38.

Figure 2:
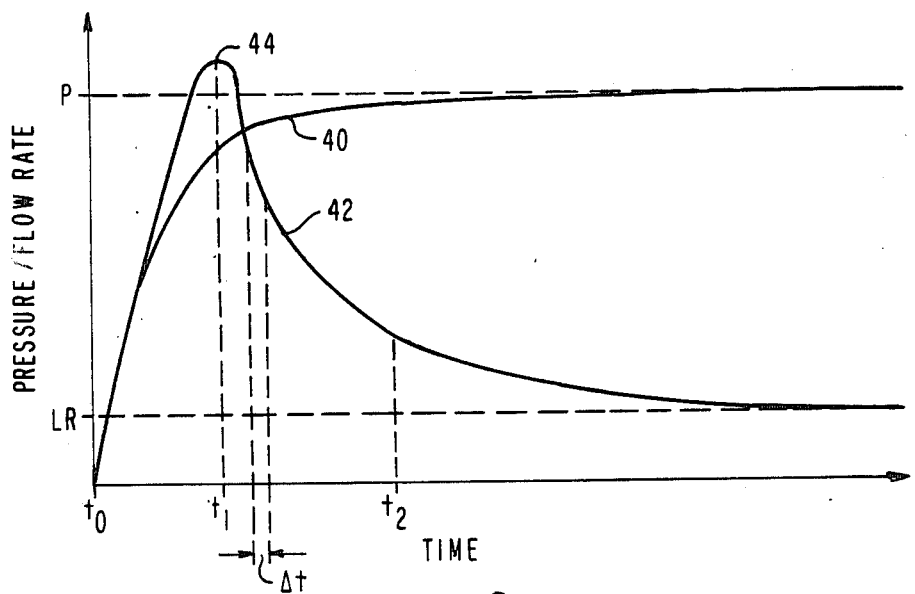
FIG. 2 represents typical gas flow signature data produced during pressurization of a cavity in a test item.

Typical gas flow signature data is illustrated in FIG. 2. With the valve 18 in FIG. 1 being opened at time $t_0$, curve 40 represents the pressure in the test item cavity and curve 42 represents the flow rate of the pressurizing gas into the cavity. The test item cavity pressure approaches the regulated source gas pressure P asymptotically. The flow rate into the test item cavity can be divided into two sections: the initial flow rate (also called fill flow) between times $t_0$ and $t_1$; and flow decay occurring after time $t_1$. The signature represents the pressurization flow plus the leak rate LR which is asymptotically approached by the flow rate curve 42. By integrating the signature during the earlier stages of pressurization flow, this invention predicts the leak flow without having to wait until the pressurization flow is insignificant.

In FIG. 2, the integration period begins at time $t_1$ and ends at time $t_2$. The discrete integration interval is represented by $\Delta t$. Integrating the gas flow signature is accomplished by using the following discrete approximation.

$$\text{Integration Value} = \sum_{k=0}^{k=(t_2-t_1)/\Delta t} \text{flow}(t_1 + k\Delta t) \quad (1)$$

The area under the flow decay portion of the signature is proportional to the size of the leak. A small leak produces a small integration value while a large leak produces a large integration value. To provide the shortest cycle time, the integrated value of the recorded test item flow is compared to an integrated value calculated from previously recorded gas flow signature data for a reference test item having a known leak rate.

When selecting the starting point of the integration, $t_1$ in this example, several factors should be considered. Most standard mass flow meters will have an impulse response lag when subjected to a sudden application of the test gas. A brief recovery period may be required for the flow meter. This recovery period typically will fall within the initial gas flow phase. Furthermore, the resolution of the sensing and conversion devices being used may require delaying of the beginning of the integration interval to allow the detection of a small leak. In the refrigeration system discussed above, $t_1$ was chosen to be $10\pm0.1$ seconds following initial application of the test gas. This provided repeatable detection of 35 standard cubic centimeter per minute leaks using a reference signature data corresponding to a system having a leak rate of 32 standard cubic centimeters per minute. Although the integration period extending from $t_1$ to $t_2$ was shown to begin at the point of peak flow 44 during pressurization, it should be understood that the integration period can occur at any time following stabilization of the flow measuring instrument. In addition, the fill flow path 22 may remain open during the recording step. Therefore, it should be clear that data recording may occur during the fill phase of pressurization gas flow.

Figure 3:
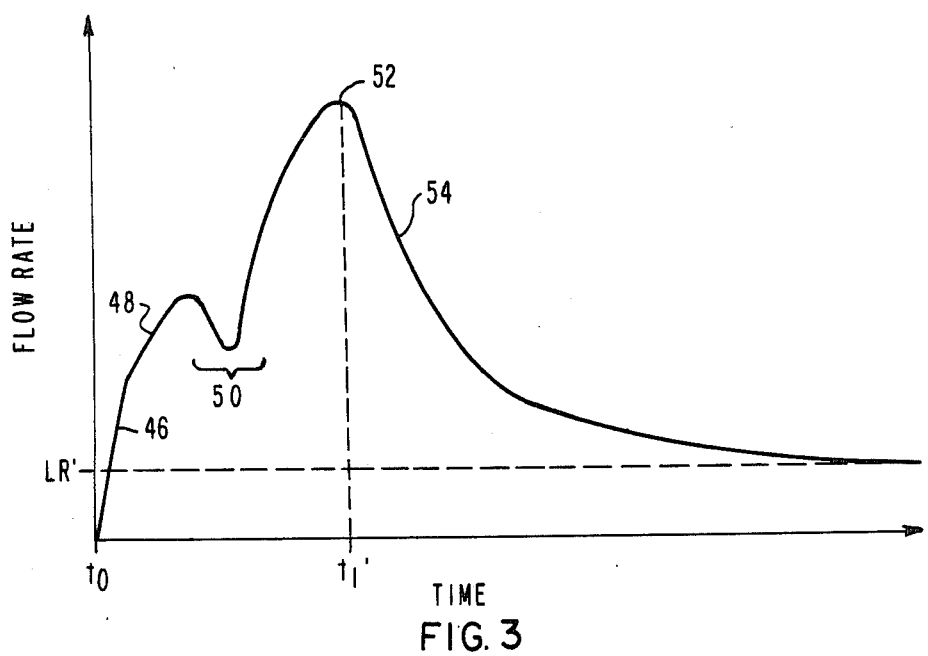
FIG. 3 represents gas flow signature data for a test item having a complex cavity, such as a refrigeration system.

The gas flow signature of a test item having a complex cavity will have many deviations from the typical gas flow signature illustrated in FIG. 2. For example, FIG. 3 illustrates the gas flow signature for a refrigeration system having a leak rate LR'. The initial slope 46 results from recovery of the flow meter from its initial response lag. The second slope 48 indicates an initial flow restriction within the test item. A peak and valley 50 within the initial flow results from the combination of multiple flow paths and various restrictions within the cavity of the test item. Peak flow 52 is delayed to $t_1'$ by internal restrictions in the test item cavity and by thermal expansion of the test gas caused by heat transfer coils in the test item. All of these factors combine to result in a delay of the start of the exponential flow decay 54. It should therefore be apparent that the gas flow signature for any particular test item is dependent upon the physical characteristics of that test item.

The method of the present invention can be easily incorporated into an automated test system for production line use. Once testing begins, all operations including pressurization, testing and depressurization, continue automatically. Complete test cycles are extremely short. For example, in the previously mentioned refrigeration system, thirteen seconds are required for the test and five seconds are required to depressurize the test item. By using a high speed, 16-bit computer, the test system can provide several other features including: compensation for various test item temperatures, early gross leak detection, verification of pressure testing to industry standards, testing with different gases and pressures, and flexible communications with other equipment.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A method of leak testing a cavity in a test item, comprising the steps of:
    applying a pressurizing gas, at a preselected pressure, to a cavity in a test item;
    recording the flow of said pressurizing gas during pressurization of the cavity to obtain recorded gas flow data;
    comparing the recorded gas flow data with predetermined reference threshold data;
    producing an excessive leak signal if said recorded gas flow rate data exceeds said reference threshold data;
    wherein said step of applying a pressurizing gas comprises the step of connecting a source of pressurizing gas and the test item to opposite ends of a flow divider having a continuously open fill flow path and a fractional flow path, such that the flow of said pressurizing gas through said fill flow path is larger than the flow of said pressurizing gas through said fractional flow path; and
    wherein said step of recording the flow of said pressurizing gas comprises the step of monitoring the flow of said pressurizing gas in said fractional flow path to produce a signal representative of the total flow of said pressurizing gas into said test item, and processing said signal to produce a characterizing quantity.

2. A method of leak testing a cavity in a test item, in accordance with claim 1, wherein:
said applying and recording steps occur prior to stabilization of the flow of said pressurizing gas.

3. A method of leak testing a cavity in a test item, in accordance with claim 1, wherein said recording step comprises the steps of:
producing a signal representative of the flow of said pressurizing gas; and
integrating said signal to produce said recorded gas flow data.

4. A method of leak testing a cavity in a test item, in accordance with claim 1, wherein:
said reference threshold data is a digital number representative of a pressurizing gas flow rate for a reference test unit having a known leak rate; and
said comparing step comprises the step of comparing said recorded gas flow data with said digital number.

5. A method of leak testing a cavity in a test item, as recited in claim 1, wherein following initial application of said pressurizing gas the method further comprises the step of:
waiting for a predetermined time period following initial application of said pressurizing gas, said predetermined time period being greater than the expected time required for stabilization of instruments used to perform said recording step; and
wherein said recording step occurs after the expiration of said predetermined time period.

6. A method of leak testing a cavity in a test item, as recited in claim 5, wherein said predetermined time period is greater than the expected time required for said pressurizing gas to reach maximum flow rate.

7. A method of leak testing a cavity in a test item, as recited in claim 1, wherein said recording step comprises the steps of:
producing a digital signal representative of said pressurizing gas flow rate; and integrating said digital signal.

8. A method of leak testing a cavity in a test item, comprising the steps of:
applying a pressurizing gas, at a preselected pressure, to a cavity in a test item;
recording the flow of said pressurizing gas during pressurization of the cavity to obtain recorded gas flow data;
comparing the recorded gas flow data with predetermined reference threshold data; and
producing an excessive leak signal if said recorded gas flow rate data exceeds said reference threshold data;
said recording step occurring during a decreasing flow of said pressurizing gas.

9. A method of leak testing a cavity in a test item, in accordance with claim 8, wherein:
said applying and recording steps occur prior to stabilization of the flow of said pressurizing gas.

10. A method of leak testing a cavity in a test item, in accordance with claim 8, wherein said recording step comprises the steps of:
producing a signal representative of the flow of said pressurizing gas; and
integrating said signal to produce said recorded gas flow data.

11. A method of leak testing a cavity in a test item, in accordance with claim 8, wherein:
said reference threshold data is a digital number representative of a pressurizing gas flow rate for a reference test unit having a known leak rate; and
said comparing step comprises the step of comparing said recorded gas flow data with said digital number.

12. A method of leak testing a cavity in a test item, as recited in claim 8, wherein following initial application of said pressurizing gas the method further comprises the step of:
waiting for a predetermined time period following initial application of said pressurizing gas, said predetermined time period being greater than the expected time required for stabilization of instruments used to perform said recording step; and
wherein said recording step occurs after the expiration of said predetermined time period.

13. A method of leak testing a cavity in a test item, as recited in claim 12, wherein said predetermined time period is greater than the expected time required for said pressurizing gas to reach maximum flow rate.

14. A method of leak testing a cavity in a test item, as recited in claim 8, wherein said recording step comprises the steps of:
producing a digital signal representative of said pressurizing gas flow rate; and
integrating said digital signal.

* * * * *